(12) United States Patent
Stone et al.

(10) Patent No.: US 10,048,841 B2
(45) Date of Patent: Aug. 14, 2018

(54) COLLABORATIVE PROJECT MANAGEMENT

(71) Applicant: Brigham Young University, Provo, UT (US)

(72) Inventors: Brett Stone, Lehi, UT (US); Philip Cox, Austin, TX (US); David French, Provo, UT (US); Ammon Hepworth, Provo, UT (US); Charles Gregory Jensen, Provo, UT (US); Walter Edward Red, Provo, UT (US)

(73) Assignee: Brigham Young University, Provo, UT (US)

( * ) Notice: Subject to any disclaimer, the term of this patent is extended or adjusted under 35 U.S.C. 154(b) by 402 days.

(21) Appl. No.: 14/738,603

(22) Filed: Jun. 12, 2015

(65) Prior Publication Data

US 2015/0363094 A1    Dec. 17, 2015

Related U.S. Application Data

(60) Provisional application No. 62/012,179, filed on Jun. 13, 2014.

(51) Int. Cl.
*G06F 3/0482* (2013.01)
*G06F 3/0484* (2013.01)
*G06F 3/048* (2013.01)
*G06Q 10/10* (2012.01)

(52) U.S. Cl.
CPC .......... *G06F 3/04842* (2013.01); *G06F 3/048* (2013.01); *G06F 3/0482* (2013.01); *G06Q 10/101* (2013.01)

(58) Field of Classification Search
CPC .................................................. G06F 3/04842
USPC ........................................................ 715/753
See application file for complete search history.

(56) References Cited

U.S. PATENT DOCUMENTS

| | | | | |
|---|---|---|---|---|
| 5,790,798 A * | 8/1998 | Beckett, II | ............ | G06F 3/1462 345/428 |
| 6,070,177 A * | 5/2000 | Kao | ........................ | G06F 17/30 707/999.01 |
| 6,370,574 B1 * | 4/2002 | House | ..................... | H04M 3/36 379/265.01 |
| 6,570,590 B1 * | 5/2003 | Dubrow | ................... | G06F 3/038 715/748 |
| 7,274,375 B1 * | 9/2007 | David | .................... | G06Q 10/06 345/619 |
| 7,310,777 B2 * | 12/2007 | Cirne | ..................... | G06F 11/323 345/440.1 |
| 7,613,589 B2 * | 11/2009 | Hosagrahara | .......... | G06Q 10/04 702/182 |

(Continued)

*Primary Examiner* — Reza Nabi
*Assistant Examiner* — Daniel Rodriguez

(57) ABSTRACT

An apparatus, method, and program product are disclosed for collaborative project management. One apparatus includes a selection module that receives a selection by a local user of an information handling device to display an application screen of a remote user of multiple remote users. The application screen of the remote user displays a project used by the multiple remote users in a collaborative environment. The apparatus includes a display module that displays on the information handling device the application screen of the remote user. The application screen of the remote user is updated immediately as modifications to the project are made.

15 Claims, 9 Drawing Sheets

(56) References Cited

U.S. PATENT DOCUMENTS

| | | | | |
|---|---|---|---|---|
| 7,822,643 B2* | 10/2010 | Negley | G06Q 10/00 | 348/465 |
| 8,166,382 B2* | 4/2012 | Kuroda | G06Q 10/10 | 715/200 |
| 8,302,009 B2* | 10/2012 | Wahl | G06Q 10/06 | 715/722 |
| 8,522,240 B1* | 8/2013 | Merwarth | G06Q 10/0631 | 705/26.82 |
| 8,689,114 B2* | 4/2014 | Muller | G06Q 10/06 | 715/733 |
| 8,938,679 B1* | 1/2015 | Hsu | G06F 3/0486 | 715/230 |
| 9,106,736 B1* | 8/2015 | Slovacek | H04M 3/36 | |
| 9,454,623 B1* | 9/2016 | Kaptsan | G06F 17/50 | |
| 9,584,565 B1* | 2/2017 | Ho | H04L 65/403 | |
| 9,690,461 B2* | 6/2017 | Holler | G06F 3/04842 | |
| 2003/0179230 A1* | 9/2003 | Seidman | G06F 3/1454 | 715/750 |
| 2004/0267871 A1* | 12/2004 | Pratley | G06Q 10/10 | 709/200 |
| 2005/0198196 A1* | 9/2005 | Bohn | H04L 67/34 | 709/217 |
| 2006/0026251 A1* | 2/2006 | Cheng | G06Q 10/10 | 709/207 |
| 2006/0168530 A1* | 7/2006 | Muller | G06Q 10/10 | 715/751 |
| 2008/0148159 A1* | 6/2008 | Kogan | G06Q 10/06 | 715/753 |
| 2009/0085871 A1* | 4/2009 | Bhogal | G06F 3/0483 | 345/163 |
| 2009/0217177 A1* | 8/2009 | DeGrazia | G06F 3/0481 | 715/753 |
| 2010/0023851 A1* | 1/2010 | Schormann | G06Q 10/10 | 715/232 |
| 2010/0131587 A1* | 5/2010 | Zenz | G06F 9/52 | 709/203 |
| 2010/0192072 A1* | 7/2010 | Spataro | G06Q 10/107 | 715/753 |
| 2010/0251032 A1* | 9/2010 | Macary | G06F 11/323 | 714/38.14 |
| 2010/0318921 A1* | 12/2010 | Trachtenberg | G06Q 10/10 | 715/751 |
| 2012/0030289 A1* | 2/2012 | Buford | G06Q 10/10 | 709/205 |
| 2012/0130907 A1* | 5/2012 | Thompson | G06Q 10/103 | 705/301 |
| 2012/0166316 A1* | 6/2012 | Messina | G06Q 30/0641 | 705/27.1 |
| 2013/0151421 A1* | 6/2013 | Van Der Ploeg | G06Q 10/06 | 705/301 |
| 2014/0033056 A1* | 1/2014 | Kim | G06F 3/0484 | 715/738 |
| 2014/0331172 A1* | 11/2014 | Holler | G06F 3/04842 | 715/803 |
| 2015/0089344 A1* | 3/2015 | Pickering | G06F 17/5004 | 715/215 |
| 2015/0121466 A1* | 4/2015 | Brands | H04L 63/08 | 726/4 |
| 2015/0149929 A1* | 5/2015 | Shepherd | H04L 65/403 | 715/753 |
| 2015/0199641 A1* | 7/2015 | Napoli | G06Q 10/063114 | 705/7.15 |
| 2016/0034842 A1* | 2/2016 | Harthcryde | G06Q 10/00 | 705/7.14 |
| 2016/0155161 A1* | 6/2016 | Reisman | G06Q 10/10 | 705/26.1 |
| 2017/0177511 A1* | 6/2017 | Beel | G06F 13/102 | |

* cited by examiner

COLLABORATIVE PROJECT MANAGEMENT

CROSS REFERENCE TO RELATED APPLICATIONS

The present application is a Non-Provisional Patent Application that claims priority to U.S. Provisional Application No. 62/012,179, filed on Jun. 13, 2014, which is incorporated herein by reference in its entirety.

FIELD

The subject matter disclosed herein relates to collaborative projects, and more particularly relates to collaborative project management.

BACKGROUND

Various projects may operate in a collaborative environment. For example, a project operating in a collaborative environment may include a document, a spreadsheet, a drawing, code, a simulation, a model, a presentation, a form, an animation, and an architecture. Many users may access and/or modify the project.

BRIEF SUMMARY

An apparatus for collaborative project management is disclosed. A method and computer program product also perform the functions of the apparatus. In one embodiment, an apparatus includes a selection module that receives a selection by a local user of an information handling device to display an application screen of a remote user of multiple remote users. In some embodiments, the application screen of the remote user displays a project used by the multiple remote users in a collaborative environment. The apparatus, in a further embodiment, includes a display module that displays on the information handling device the application screen of the remote user. In certain embodiments, the application screen of the remote user is updated immediately as modifications to the project are made.

In some embodiments, the remote user does not provide direct approval for their application screen to be displayed on the information handling device. In one embodiment, the apparatus includes an application module that enables the local user to modify the project within a local application screen.

A method for collaborative project management, in one embodiment, includes receiving a selection, by a local user of an information handling device, to display an application screen of a remote user of multiple remote users. In certain embodiments, the application screen of the remote user displays a project used by the multiple remote users in a collaborative environment. The method includes, in one embodiment, displaying on the information handling device the application screen of the remote user. In certain embodiments, the application screen of the remote user is updated immediately as modifications to the project are made.

In one embodiment, the remote user of the multiple remote users receives no notification that their application screen is being displayed on the information handling device. In another embodiment, the remote user of the multiple remote users does not provide direct approval for their application screen to be displayed on the information handling device. The method, in certain embodiments, includes receiving a selection, by the local user of the information handling device, to display an application screen of a second remote user of the multiple remote users. In one embodiment, the method includes displaying the application screen of the remote user within a managing application screen.

In certain embodiments, the method includes displaying a local application screen that displays the project together with the application screen of the remote user. In such embodiments, the method may include enabling the local user to modify the project within the local application screen. In certain embodiments, the method includes immediately providing modifications to the project made by the local user to the multiple remote users. In such embodiments, an application screen of each of the remote users may immediately update to show the modifications.

In some embodiments, the project includes one or more of a document, a spreadsheet, a drawing, code, a simulation, a model, a presentation, a form, an animation, and an architecture. In certain embodiments, the project includes a computer-aided design ("CAD") model. In some embodiments, the method includes displaying a project tree on the information handling device. In such embodiments, the project tree may include a diagram illustrating multiple portions of the project and indicating which users are currently working on each portion of the multiple portions. In certain embodiments, the project tree indicates a cumulative time spent by the users working on each portion of the multiple portions of the project.

In one embodiment, the method includes displaying a collaboration tool that enables users to collaboratively provide graphical feedback regarding the project and to produce a collaborative output. In such an embodiment, the method may include attaching the collaborative output from the collaboration tool to a corresponding portion of the project to provide documentation regarding the corresponding portion of the project.

In one embodiment, a computer program product for collaborative project management includes a computer readable storage medium having program instructions embodied therewith. The program instructions, in some embodiments, are executable by a processor to cause the processor to receive a selection, by a local user of an information handling device, to display an application screen of a remote user of multiple remote users. In such embodiments, the application screen of the remote user displays a project used by the multiple remote users in a collaborative environment. The program instructions, in one embodiment, are executable by a processor to cause the processor to display on the information handling device the application screen of the remote user. In such an embodiment, the application screen of the remote user is updated immediately as modifications to the project are made.

The program instructions, in some embodiments, are executable by a processor to cause the processor to display the application screen of the remote user within a managing application screen. The program instructions, in one embodiment, are executable by a processor to cause the processor to display a local application screen that displays the project together with the application screen of the remote user.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
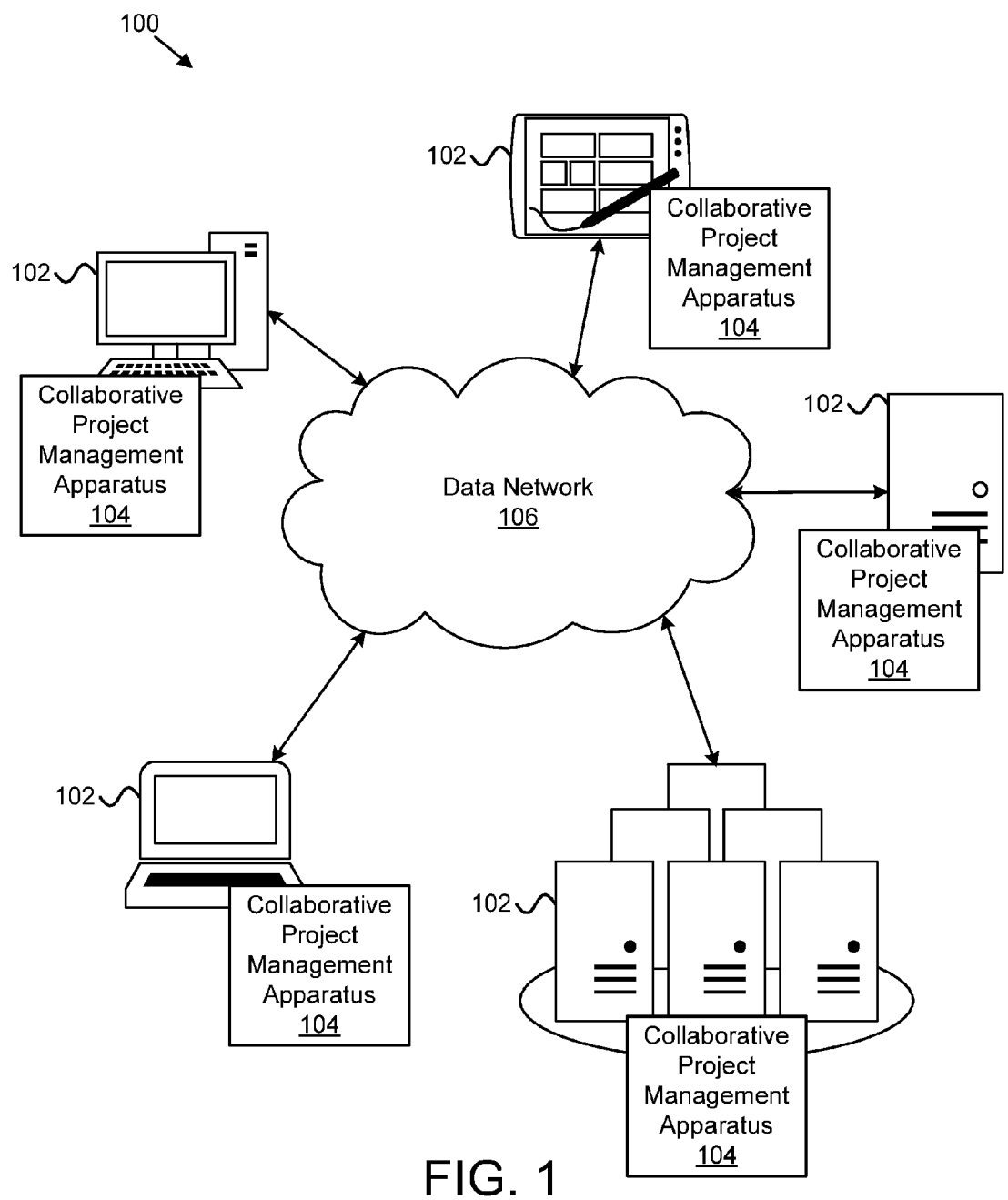
FIG. 1 is a schematic block diagram illustrating one embodiment of a system for collaborative project management in accordance with one embodiment of the present invention.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture ("ISA") instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider). In some embodiments, electronic circuitry including, for example, programmable logic circuitry, field-programmable gate arrays ("FPGA"), or programmable logic arrays ("PLA") may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

The description of elements in each figure may refer to elements of proceeding figures. Like numbers refer to like elements in all figures, including alternate embodiments of like elements.

FIG. 1 depicts one embodiment of a system 100 for collaborative project management. In one embodiment, the system 100 includes information handling devices 102, collaborative project management apparatuses 104, and networks 106. Even though a particular number of information handling devices 102, collaborative project management apparatuses 104, and networks 106 are depicted in the system 100 of FIG. 1, one of skill in the art will recognize that any number or configuration of information handling devices 102, collaborative project management apparatuses 104, and networks 106 may be present in the system 100.

The information handling devices 102, in certain embodiments, include computing devices, such as desktop computers, laptop computers, tablet computers, smart phones, smart televisions, smart watches, or the like. The information handling devices 102 may also include servers, such as web servers, application servers, file servers, media servers, email servers, cloud servers, backup servers, virtual servers, computer-aided design ("CAD") servers, or the like. In some embodiments, the information handling devices 102 may be part of a data center used for data storage, data backup, data replication, disaster recovery, and/or the like. The information handling devices 102 may be located in geographically remote locations, in the same geographic location (e.g., the same data center), or some combination of both.

The information handling devices 102 may be configured to store data, backup data, replicate data, or the like. For example, the information handling devices 102 may be configured to perform synchronous or asynchronous data replication. In another example, information handling devices 102 may be configured as failover devices for one or more associated production information handling devices 102. Moreover, the information handling devices 102 may comprise one or more storage volumes, storage devices, redundant array of independent disks ("RAID") devices or configurations, or the like, such as hard-disk drives, solid-state drives, flash memory devices, random-access memory ("RAM"), serial advanced technology attachment ("SATA") devices, tape devices, or the like. In some embodiments, the information handling devices 102 are in communication via one or more data networks 106, described below.

In one embodiment, the collaborative project management apparatus 104 receives a selection, by a local user of an information handling device 102, to display an application screen of a remote user of multiple remote users. In some embodiments, the application screen of the remote user displays a project used by the multiple users in a collaborative environment. In certain embodiments, the collaborative project management apparatus 104 displays on the information handling device 102 the application screen of the remote user. In some embodiments, the application screen of the remote user is updated immediately as modifications to the project are made. In this manner, the collaborative project management apparatus 104 may facilitate collaborative project management of a large number of users that collaboratively participate in modifying a project. For example, a manager may be able to view one or more application screens of remote users to aid in managing the project. In certain embodiments, as described below with reference to FIGS. 2 and 3, the collaborative project management apparatus 104 includes multiple modules that perform the operations of the collaborative project management apparatus 104.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network ("LAN"), an optical fiber network, the internet, or other digital communication network. The data network 106 may include two or more networks. The data network 106 may include one or more servers, routers, switches, and/or other networking equipment. The data network 106 may also include computer readable storage media, such as a hard disk drive, an optical drive, non-volatile memory, random access memory ("RAM"), or the like.

Figure 2:
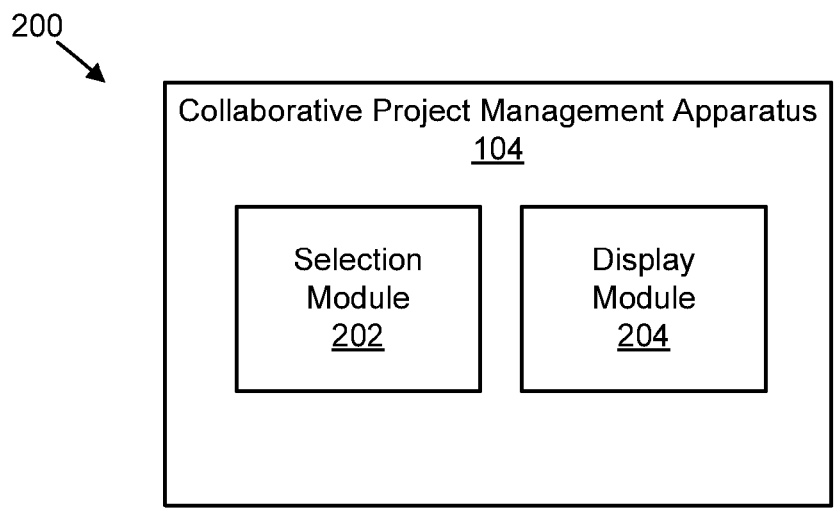
FIG. 2 is a schematic block diagram illustrating one embodiment of a module for collaborative project management in accordance with one embodiment of the present invention.

FIG. 2 is a schematic block diagram illustrating one embodiment of a module 200 for collaborative project management. In one embodiment, the module 200 includes an embodiment of a collaborative project management apparatus 104. The collaborative project management apparatus 104, in various embodiments, includes one or more of a selection module 202 and a display module 204, which are described in more detail below.

In one embodiment, the selection module 202 receives a selection by a local user of an information handling device 102 to display an application screen of a remote user. As may be appreciated, the remote user may be selected from a multiple number of remote users. In certain embodiments, the selection module 202 may receive a selection by the local user of the information handling device 102 to display an application screen of a second remote user selected from the multiple number of remote users. Moreover, as may be appreciated, the application screens of more than two remote users may be selected by the local user for displaying. In some embodiments, the remote users may be users that a manager (e.g., the local user) manages. In other embodiments, the remote users may be users assigned to work on a particular project. In one embodiment, the local user may also be assigned to work on the particular project. In certain embodiments, the application screen of each remote user displays a project used by multiple remote users in a collaborative environment.

The application screen may be any suitable application screen. Moreover, the application screen may be a duplicate of the application screen of the remote user. In some embodiments, the application may be a computer-aided design ("CAD") application, an engineering application, a document processing application, and so forth. Accordingly, the application screen may be the screen or window (e.g., graphical user interface ("GUI") displayed by the application. The project may be any suitable project, such as a project including one or more of a document, a spreadsheet, a drawing, code, a simulation, a model, a presentation, a form, an animation, and an architecture, for example. In some embodiments, the project may include a CAD model.

The display module 204, in some embodiments, displays on the information handling device 102 the application screen of the remote user. In one embodiment, the display module 204 displays on the information handling device 102 the application screen of multiple remote users at the same time (e.g., simultaneously). In some embodiments, the application screen or screens of one or more remote users may be displayed within a managing application screen of a managing application.

In certain embodiments, the application screen of the remote user is updated immediately as modifications to the project are made by any user. As may be appreciated, modifying the project may include editing the project, adding to the project, changing the project, deleting from the project, and so forth. Accordingly, the application screen of the remote user displayed on the information handling device 102 may match the actual application screen being used by the remote user. Therefore, the local user may be able to track and/or view immediately what is being done by the remote user in the application. For example, in an embodiment in which the application is a CAD application, the remote user may modify a project. In such an example, the local user of the information handling device 102 may be able to watch the application screen of the remote user on the information handling device 102, receive immediate updates of modifications to the project and, therefore, see immediately the modifications while they are being made to the project.

Immediate updates may be conducted immediately (i.e., without intended hesitation) and may occur in real-time from the perspective of the user. As may be appreciated, immediate updates may also be considered real-time updates, near real-time updates, substantially real-time updates, dynamic updates, and so forth. For example, immediate updates may be provided automatically within seconds or minutes of a modification to the project being made. Moreover, immediate updates may operate in a collaborative environment such that when modifications to the project are made and/or saved, the modifications are provided to other concurrent users of the project so that all versions of the project have the latest modifications. For example, certain embodiments may store the project locally on an information handling device 102 of each user (e.g., thin-server, thick-client environments). Accordingly, immediate updates may include providing updates to the project stored on each information handling device 102. In some embodiments, the immediate updates are provided only for a portion of the project.

Furthermore, deferred updates may also be considered selective updates, non-real time updates, delayed updates, and so forth. For example, deferred updates may be provided at a scheduled time, when computer resources are sufficient, when a project is no longer separated into portions, upon selection, on-demand, and so forth. Moreover, deferred updates may operate in a collaborative environment such that when modifications are made and/or saved, the modifications are not immediately provided to the users, but are stored to be provided to users of the project at a later time, such as in batches and/or being selectively applied.

As may be appreciated, in certain embodiments, the user does not provide direct approval for their application screen to be displayed on the information handling device 102. Instead, the application may automatically enable sharing of the application screen with users having appropriate permissions, such as managers, team leads, or coworkers. Moreover, in some embodiments, the remote user receives no notification that their application screen is being displayed on the information handling device 102. However, in certain embodiments, the remote user may have an indicator on their application screen to show that their application screen is being displayed on the information handling device 102.

In some embodiments, at least a portion of the selection module 202 and the display module 204 includes one or more of hardware and executable code. In such embodiments, the executable code may be stored on one or more computer readable storage media.

Figure 3:
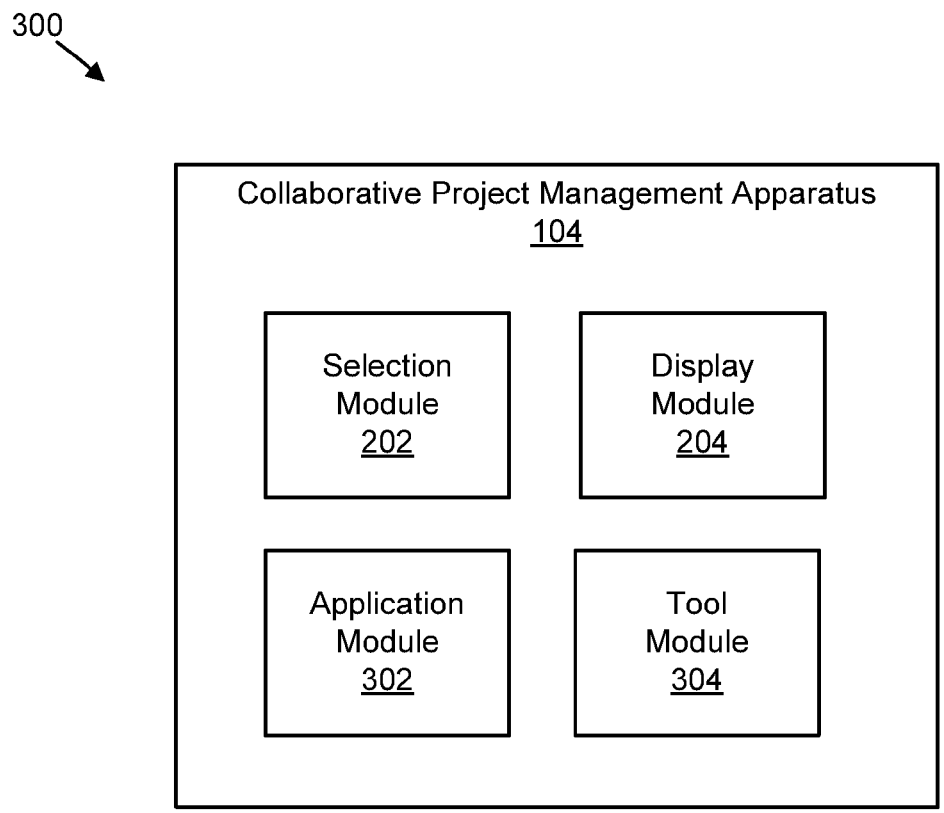
FIG. 3 is a schematic block diagram illustrating one embodiment of another module for collaborative project management in accordance with one embodiment of the present invention.

FIG. 3 is a schematic block diagram illustrating one embodiment of another module 300 for collaborative project management. In one embodiment, the module 300 includes an embodiment of a collaborative project management apparatus 104. The collaborative project management apparatus 104, in various embodiments, includes one or more of a selection module 202 and a display module 204, which may be substantially similar to the selection module 202 and the display module 204 described above. The collaborative project management apparatus 104 may also include one or more of an application module 302 and a tool module 304, which are described in more detail below.

In one embodiment, the application module 302 enables the local user to modify the project within a local application screen. In some embodiments, the display module 204 displays the local application screen. In such embodiments, the local application screen may display the project together with one or more application screens of remote users. Moreover, in certain embodiments, modifications made to the project by the local user may be immediately provided to the multiple remote users. In such embodiments, the application screen of each of the remote users may be immediately updated to show the modifications. The local application screen may facilitate managing the multiple remote users and may be used to coordinate work on the project.

The tool module 304, in certain embodiments, includes various tools that may aid in managing the multiple remote users. In some embodiments, some or all of the tool module 304 may be part of the application module 302. In certain embodiments, some or all of the tool module may be displayed within the local application screen. The tool module 304 may include a project tree that includes a diagram illustrating portions of the project and indicating which users of the remote users are currently working on each portion of the project. Furthermore, in some embodiments, the tool module 304 may include a collaboration tool that enables users to collaboratively provide graphical feedback regarding the project and to produce a collaborative output. In one embodiment, the collaborative output from the collaboration tool may be attached to a corresponding portion of the project to provide documentation regarding the corresponding portion of the project.

Figure 4:
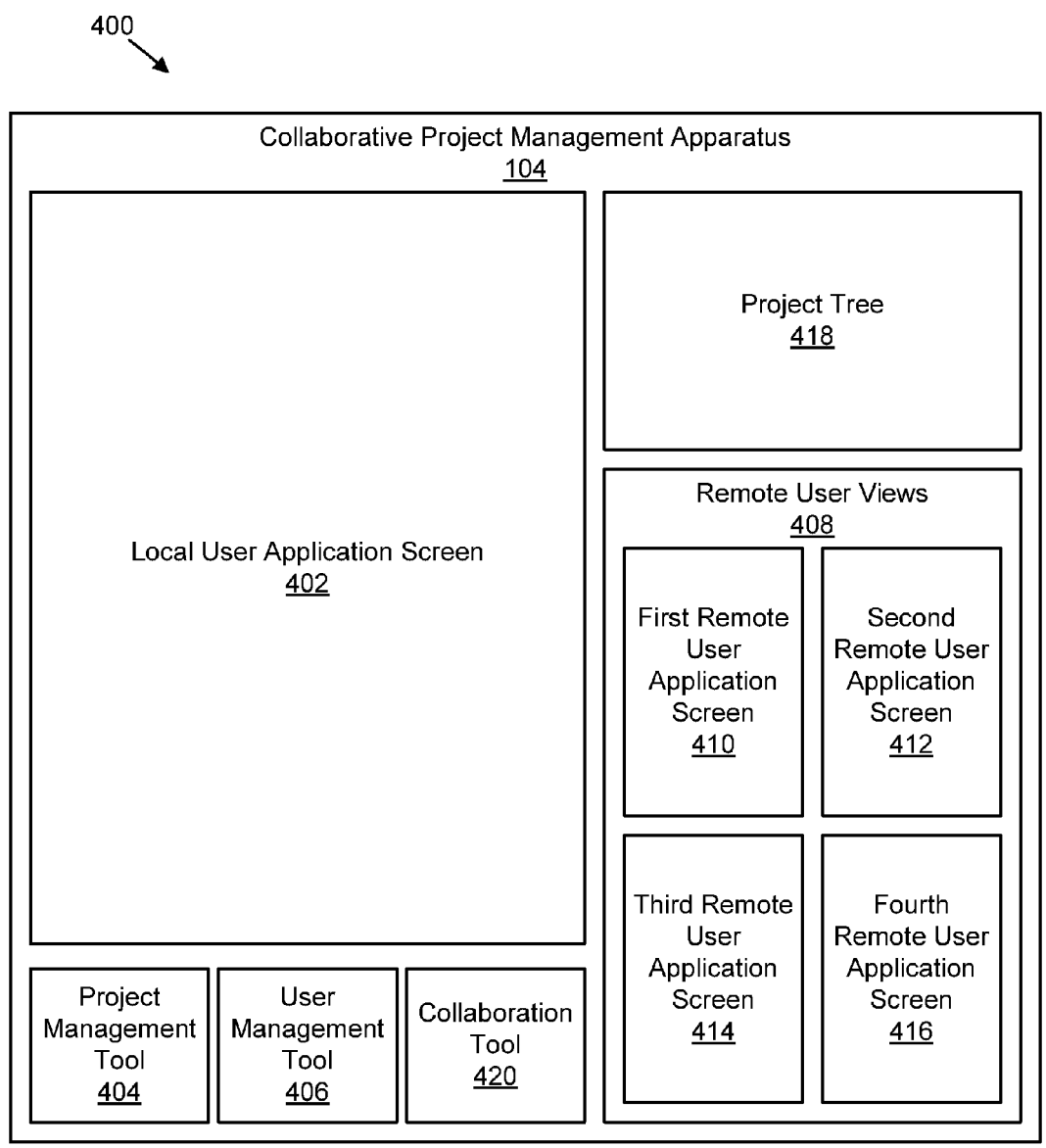
FIG. 4 is a schematic block diagram illustrating an apparatus including one embodiment of an apparatus for collaborative project management in accordance with one embodiment of the present invention.

FIG. 4 is a schematic block diagram illustrating one embodiment of an apparatus 400 for collaborative project management. As illustrated, the apparatus 400 includes one embodiment of a collaborative project management apparatus 104. The collaborative project management apparatus 104 enables collaboration among multiple users using a variety of integrated tools and features without switching between different applications. For example, a manager may be able to monitor the work of members of a team using the illustrated interface.

The collaborative project management apparatus 104 includes a local user application screen 402, a project management tool 404, a user management tool 406, and remote user views 408, as explained in greater detail below. Moreover, the remote user views 408 include a first remote user application screen 410, a second remote user application screen 412, a third remote user application screen 414, and a fourth remote user application screen 416, as explained in greater detail below. The collaborative project management apparatus 104 also includes a project tree 418 and a collaboration tool 420, as explained in greater detail below.

The local user application screen 402 displays a local instance of an application, such as a CAD application. The local instance of the application enables the local user to modify the project. Moreover, the local instance of the application may receive immediate updates to the project after modifications are made to the project by remote users.

The remote user views 408 show application screens of remote users for the same project displayed in the local user application screen 402. The remote user views may include any number of remote user application screens, such as one or more. In the illustrated embodiment, four user application screens are displayed. Specifically, the first, second, third, and fourth remote user application screens 410-416 are displayed. The remote user application screens 410-416 may each receive immediate updates corresponding to the remote user using the application. Accordingly, the remote user application screens 410-416 may appear to be a live video feed. Thus, the local user (e.g., manager) may see in each remote user application screen 410-416 what the remote user sees in their application.

The local user may use a variety of tools to manage the remote users and/or the project. These tools include the project management tool 404, the user management tool 406, the project tree 418, and the collaboration tool 420, which are described in greater detail in FIGS. 5, 6, 7, and 8, respectively.

Figure 5:
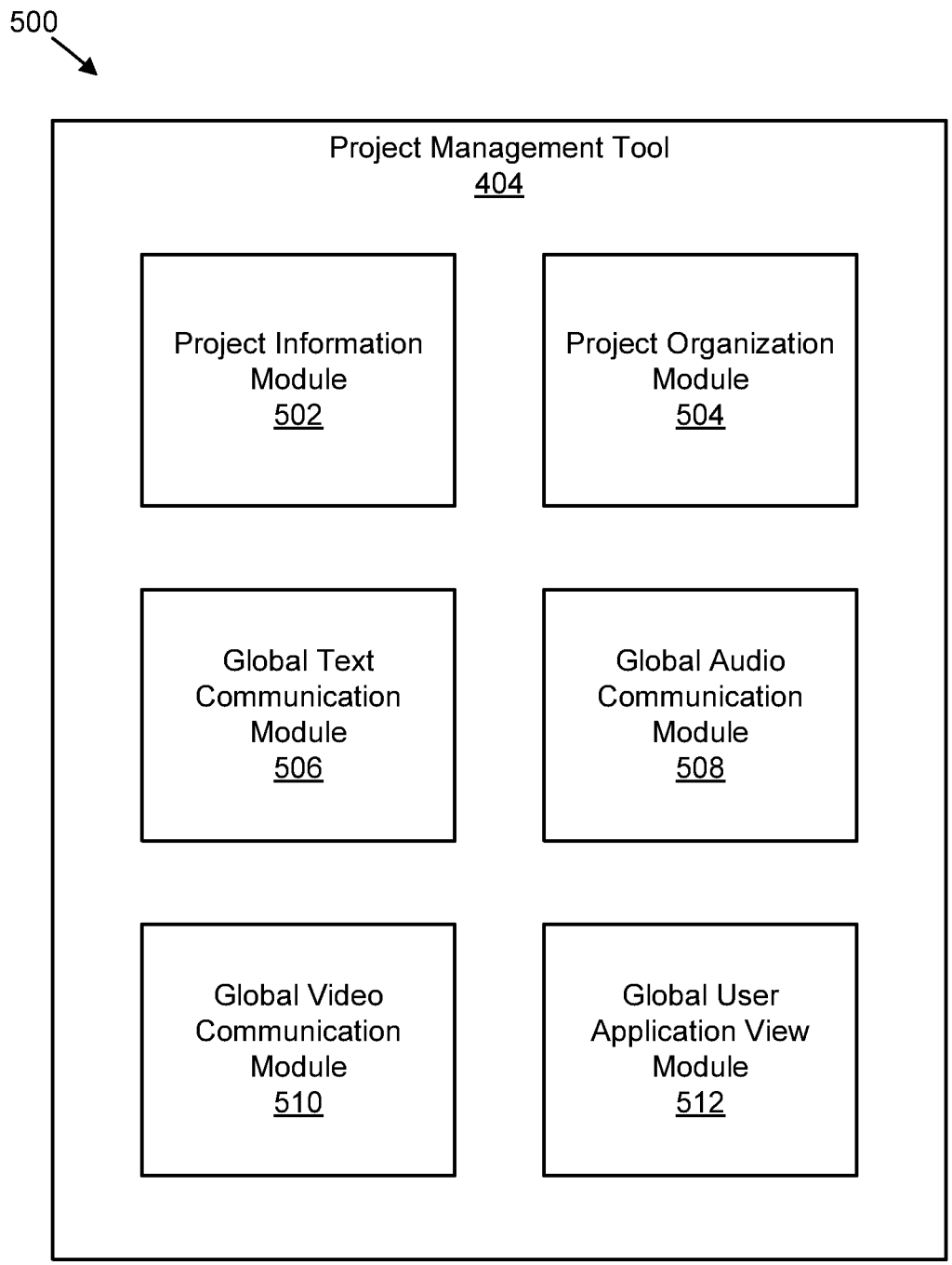
FIG. 5 is a schematic block diagram illustrating an apparatus including one embodiment of a project management tool in accordance with one embodiment of the present invention.

FIG. 5 is a schematic block diagram illustrating an apparatus 500 including one embodiment of a project management tool 404. The project management tool 404 may be used by the local user (e.g., a manager) to manage various aspects of the project and/or remote users (e.g., team members). The project management tool 404 includes a project information module 502, a project organization module 504, a global text communication module 506, a global audio communication module 508, a global video communication module 510, and a global user application view module 512.

The project information module 502 may be used to modify (e.g., add, delete, and/or update) information corresponding to the project. For example, the project information module 502 may be used to modify a name of the project, a contact for the project, a schedule for the project, timeline for the project, budget for the project, and so forth. Moreover, the project organization module 504 may be used to modify information concerning remote users (e.g., team members) for the project. For example, the project organization module 504 may be used to add and/or remove remote users, modify assignments of remote users to portions of the project, and so forth.

The global text communication module 506 enables the local user to communicate with all remote users simultaneously using text messages. In certain embodiments, the global text communication module 506 may enable the local user to communicate with a selected number of remote users using text messages. Moreover, the global audio communication module 508 enables the local user to communicate with all remote users simultaneously using audio communication. In certain embodiments, the global audio communication module 508 may enable the local user to communicate with a selected number of remote users using audio communication. Furthermore, the global video communication module 510 enables the local user to communicate with all remote users simultaneously using video communication. In certain embodiments, the global video communication module 510 may enable the local user to communicate with a selected number of remote users using video communication. The global user application view module 512 may facilitate showing and/or hiding the views (e.g., remote user application screens) for all remote users simultaneously. In some embodiments, the global user application view module 512 may facilitate showing and/or hiding the views for a selected number of remote users simultaneously.

Figure 6:
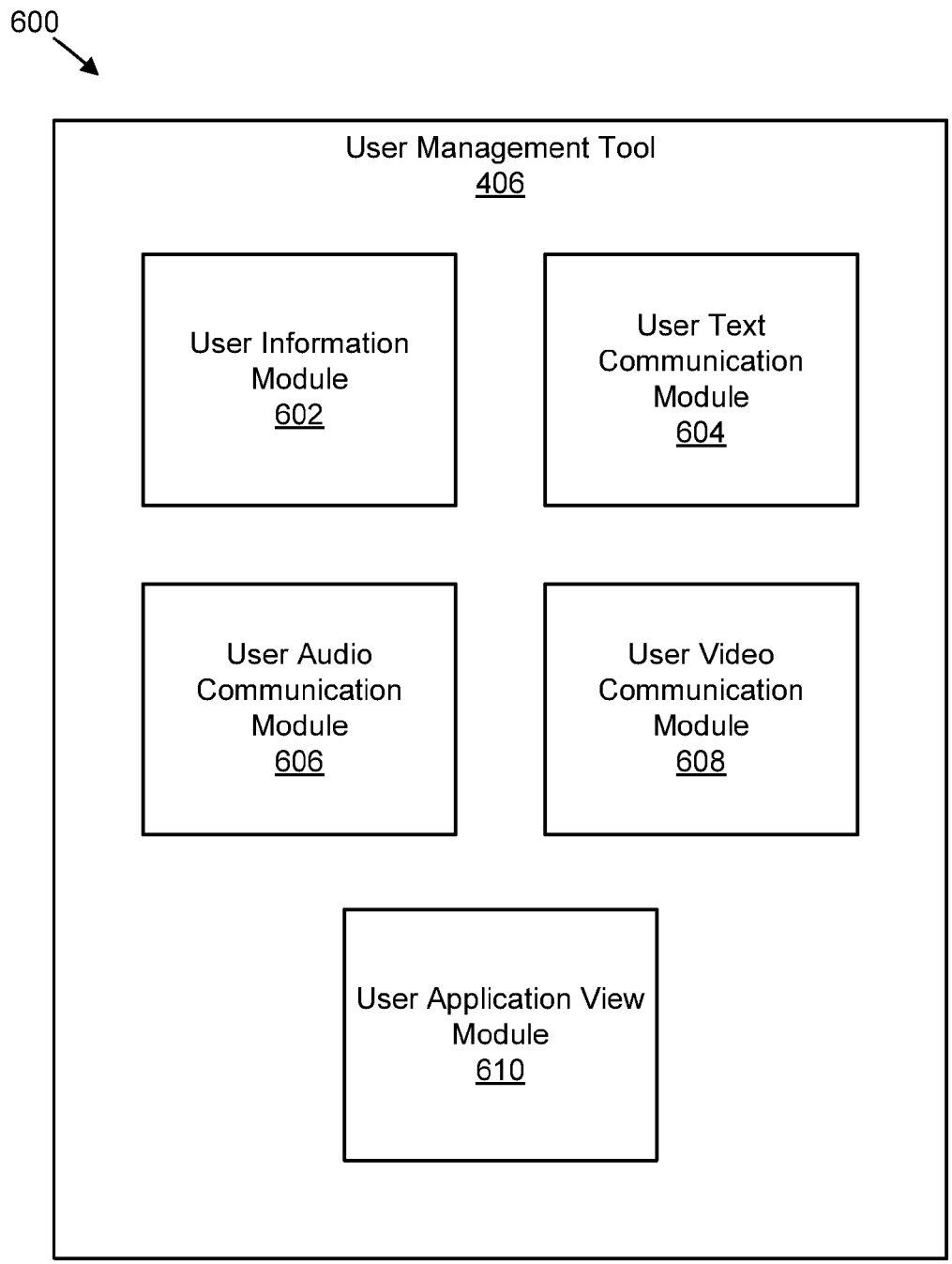
FIG. 6 is a schematic block diagram illustrating an apparatus including one embodiment of a user management tool in accordance with one embodiment of the present invention.

FIG. 6 is a schematic block diagram illustrating an apparatus 600 including one embodiment of a user management tool 406. In certain embodiments, the apparatus 600 may include one user management tool 406 for each user. The user management tool 406 includes a user information module 602, a user text communication module 604, a user audio communication module 606, a user video communication module 608, and a user application view module 610. The user information module 602 may be used to view and/or modify information concerning a selected user. In certain embodiments, the user information module 602 may include information about the selected user, such as a name, user identification ("ID"), location, title, picture, and so forth.

The user text communication module 604 enables the local user to communicate with the selected user using text messages. Moreover, the user audio communication module 606 enables the local user to communicate with the selected user using audio communication. Furthermore, the user video communication module 608 enables the local user to communicate with the selected user using video communication. The user application view module 610 may facilitate showing, hiding, enlarging, and/or shrinking the view (e.g., remote user application screen) for the selected user.

Figure 7:
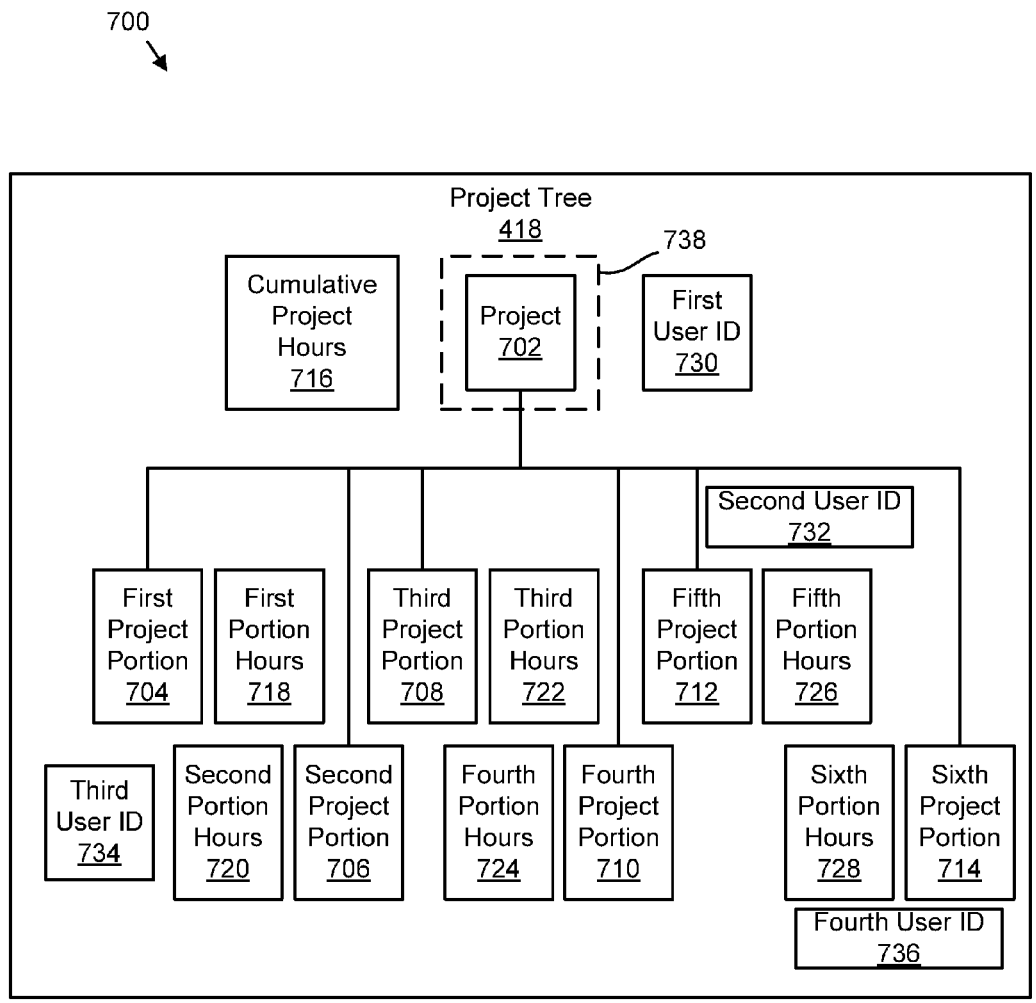
FIG. 7 is a schematic block diagram illustrating an apparatus including one embodiment of a project tree in accordance with one embodiment of the present invention.

FIG. 7 is a schematic block diagram illustrating an apparatus 700 including one embodiment of a project tree 418. The project tree 418 may be used to illustrate work progress on the project and/or allocation of remote users to portions of the project. Specifically, the project tree 418 illustrates a project 702 that includes a first project portion 704, a second project portion 706, a third project portion 708, a fourth project portion 710, a fifth project portion 712, and a sixth project portion 714.

A cumulative project hours 716 may be displayed adjacent to the project 702 to show a total number of hours (e.g., man-hours) that have been worked on the project 702. Moreover, each portion of the project 702 may include a total number of hours worked on that respective portion. Specifically, a first portion hours 718 may be displayed adjacent to the first project portion 704, a second portion hours 720 may be displayed adjacent to the second project portion 706, a third portion hours 722 may be displayed adjacent to the third project portion 708, a fourth portion hours 724 may be displayed adjacent to the fourth project portion 710, a fifth portion hours 726 may be displayed adjacent to the fifth project portion 712, and a sixth portion hours 728 may be displayed adjacent to the sixth project portion 714. Accordingly, the local user may see the number of hours spent working on each portion 704-714 of the project 702. This may facilitate the local user allocating remote users to particular portions 704-714 of the project 702.

The project tree 418 also indicates which users are currently working on particular portions 704-714 of the project 702. In the illustrated embodiment, a first user identification ("ID") 730 is displayed adjacent to the project 702, a second user ID 732 is displayed adjacent to the fifth project portion 712, a third user ID 734 is displayed adjacent to the second project portion 706, and a fourth user ID 736 is displayed adjacent to the sixth project portion 714. The user IDs 730-736 are displayed adjacent to the project 702 or project portions 704-714 to indicate that the user that corresponds to the respective user ID 730-736 is currently working on the respective project 702 or portion 704-714. The user IDs 730-736 may be any suitable indication to represent a particular user, such as a name, a picture, a username, an employee number, and so forth. Accordingly, the local user may visually see which users are working on particular portions of the project 702. The portion of the project 702 being worked on by the local user may be indicated using dashed lines 738, as illustrated, or the portion of the project 702 being worked on by the local user may be indicated using any suitable technique.

In certain embodiments, a log is maintained to indicate which users worked on particular portions 704-714 of the project 702. In some embodiments, the log may be accessed by selecting and/or clicking the project 702, the project portions 704-714, the cumulative project hours 716, and/or the project portion hours 718-728. Thus the local user (e.g., manager) may be enabled to monitor the progress of work on the project 702 and/or monitor the users (e.g., team) working on the project 702.

Figure 8:
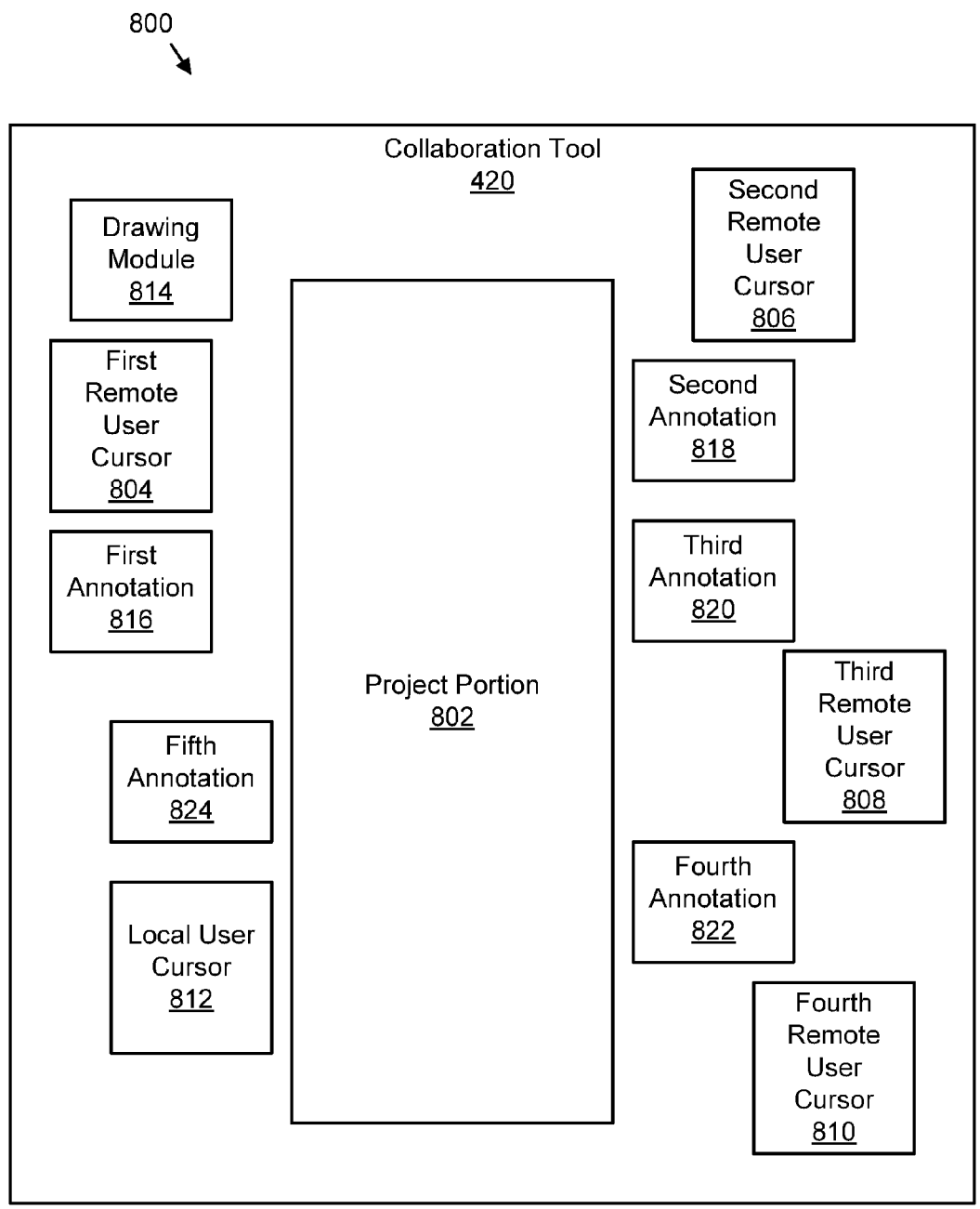
FIG. 8 is a schematic block diagram illustrating an apparatus including one embodiment of a collaboration tool in accordance with one embodiment of the present invention.

FIG. 8 is a schematic block diagram illustrating an apparatus 800 including one embodiment of a collaboration tool 420. The collaboration tool 420 enables users to collaboratively provide graphical feedback simultaneously (e.g., in real-time). The collaborative tool 420 may be accessed from within the application of the remote users and/or the local user. The collaborative tool 420 enables the users to take a snapshot of an application screen and share the snapshot with other users. For example, a project portion 802 (e.g., snapshot) may be shared with other users as illustrated in the present embodiment.

The collaborative tool 420 also enables the users to share ideas regarding the project portion 802. A first remote user cursor 804 is displayed and corresponds to input provided by a first remote user, a second remote user cursor 806 is displayed and corresponds to input provided by a second remote user, a third remote user cursor 808 is displayed and corresponds to input provided by a third remote user, a fourth remote user cursor 810 is displayed and corresponds to input provided by a fourth remote user, and a local user cursor 812 is displayed and corresponds to input provided by a local user.

The collaborative tool 420 may include a drawing module 814 that facilitates the users annotating the project portion 802. For example, the drawing module 814 may include drawing shapes, lines, text, text features (e.g., size, color, weight, etc.), and so forth to facilitate the users annotating the project portion 802. In the illustrated embodiment, a first annotation 816 is produced by the first remote user via the first remote user cursor 804, a second annotation 818 is produced by the second remote user via the second remote user cursor 806, a third annotation 820 is produced by the third remote user via the third remote user cursor 808, a fourth annotation 822 is produced by the fourth remote user via the fourth remote user cursor 410, and a fifth annotation 824 is produced by the local user via the local user cursor 812.

As may be appreciated, each of the first, second, third, fourth, and local users may see the project portion 802, the drawing module 814, the cursors 804-812, and the annotations 816-824. Furthermore, the combination of the projection portion 802 and the annotations 816-824 may be saved (e.g., a screenshot) to provide a history (e.g., a collaborative output) of the collaboration that occurred. In certain embodiments, the collaborative output may be stored together with the project portion 802. In some embodiments, the collaborative output may be attached to a visible portion of the project (e.g., a part in a CAD model). In such embodiments, the collaborative output may be attached like a visual sticky note to indicate that collaboration occurred for a particular portion of the project. In some embodiments, the visual sticky note may be selected to display the collaborative output. It should be noted that the application may facilitate taking the snapshot of the project portion 802 to be used by the collaboration tool 420. In certain embodiments, the application may facilitate capturing the snapshot via a menu selection, a mouse click, and so forth.

Figure 9:
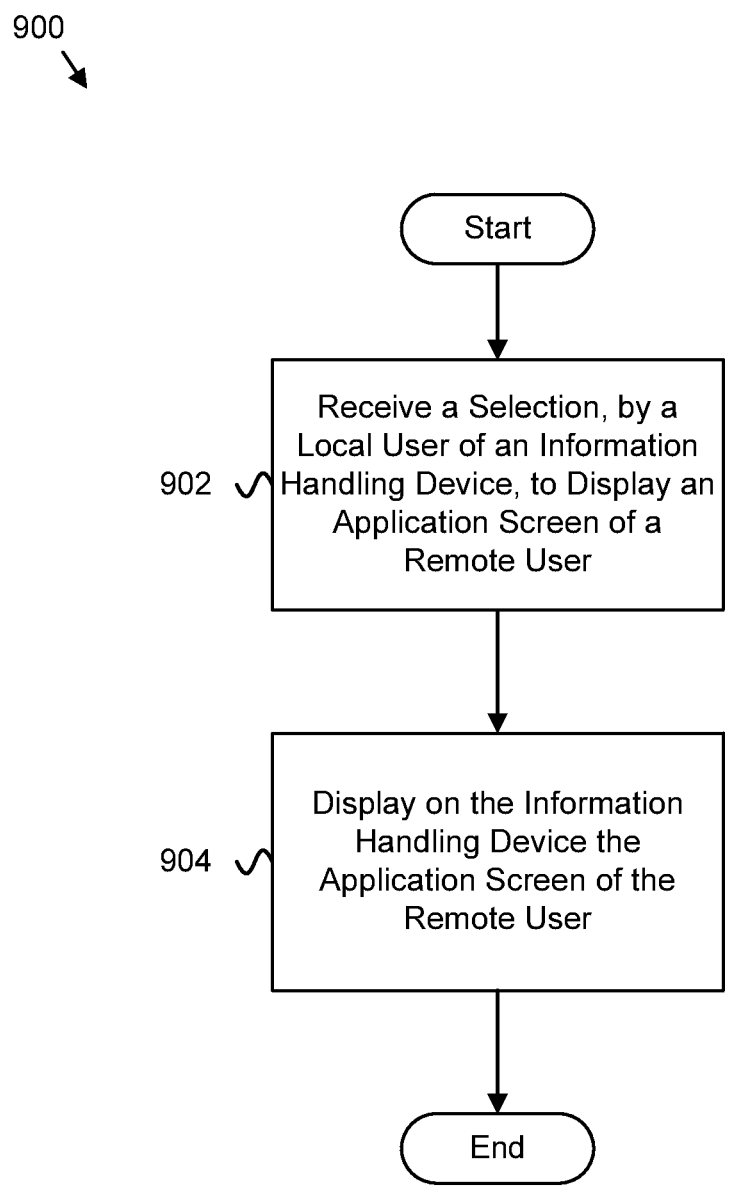
FIG. 9 is a schematic flow chart diagram illustrating one embodiment of a method for collaborative project management in accordance with one embodiment of the present invention.

FIG. 9 is a schematic flow chart diagram illustrating one embodiment of a method 900 for collaborative project management. The method 900 begins and the collaborative project management apparatus 104 receives 902 a selection, by a local user of an information handling device 102, to display an application screen of a remote user of multiple users. In certain embodiments, the application screen of the remote user displays a project used by the remote users in a collaborative environment. In some embodiments, the selection module 202 receives 902 the selection to display the application screen of the remote user. In certain embodiments, the collaborative project management apparatus 104 receives a selection, by the local user of the information handling device 102, to display an application screen of a second remote user of the multiple users.

In some embodiments, the project may include one or more of a document, a spreadsheet, a drawing, code, a simulation, a model, a presentation, a form, an animation, and an architecture. In certain embodiments, the project may include a CAD model.

The collaborative project management apparatus 104 displays 904 on the information handling device 102 the application screen of the remote user, and the method 900 ends. In certain embodiments, the application screen of the remote user is updated immediately as modifications to the project are made. In some embodiments, the display module 204 displays 904 on the information handling device 102 the application screen of the remote user. In one embodiment, displaying 904 on the information handling device 102 the application screen of the remote user includes displaying the application screen of the remote user within a managing application screen. In certain embodiments, the remote user receives no notification that their application screen is being displayed on the information handling device 102. In some embodiments, the remote user does not provide direct approval for their application screen to be displayed on the information handling device 102.

Figure 10:
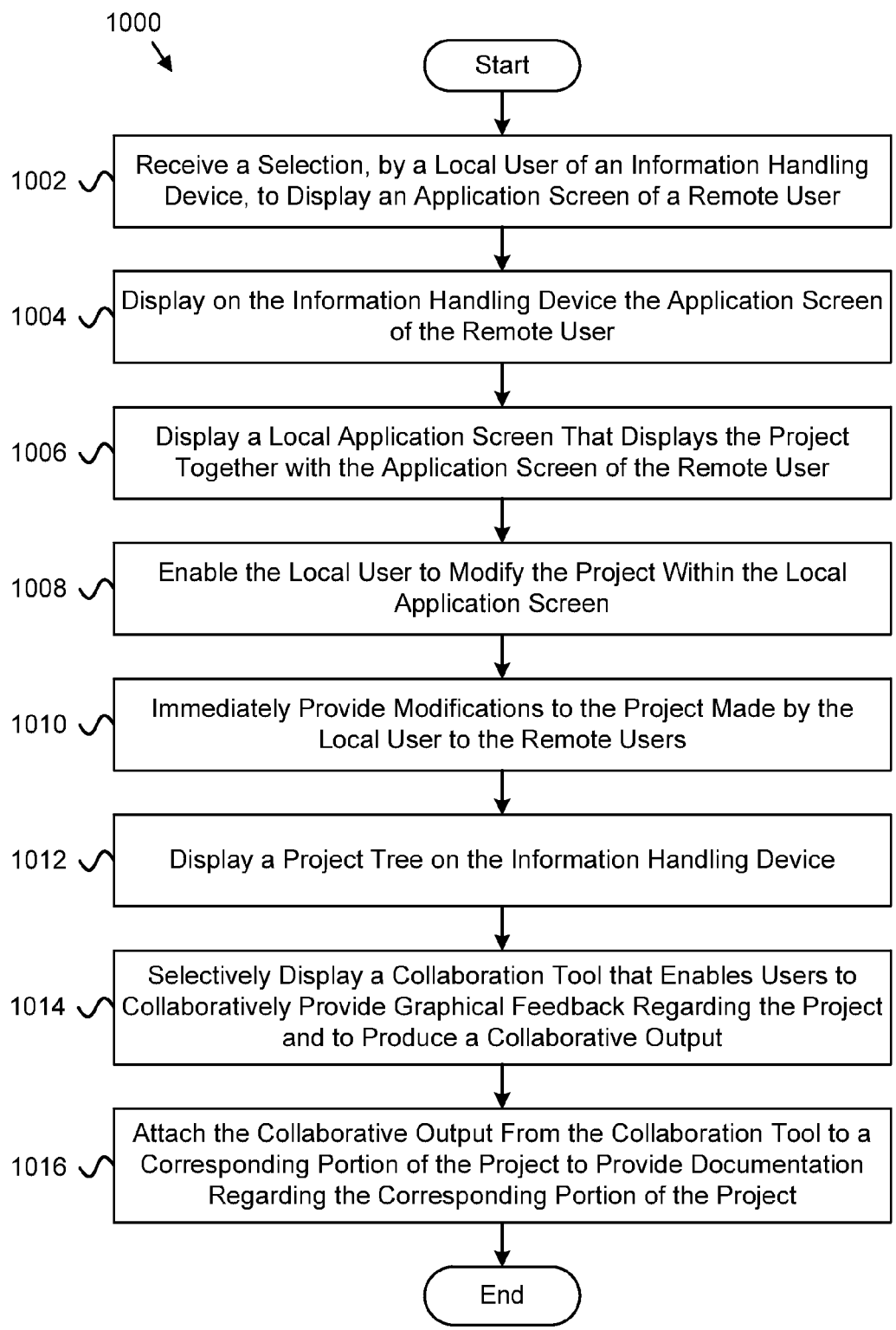
FIG. 10 is a schematic flow chart diagram illustrating one embodiment of another method for collaborative project management in accordance with one embodiment of the present invention.

FIG. 10 is a schematic flow chart diagram illustrating one embodiment of another method 1000 for collaborative project management. The method 1000 begins and the collaborative project management apparatus 104 receives 1002 a selection, by a local user of an information handling device 102, to display an application screen of a remote user of multiple users. In certain embodiments, the application screen of the remote user displays a project used by the remote users in a collaborative environment. In some embodiments, the selection module 202 receives 1002 the selection to display the application screen of the remote user. In certain embodiments, the collaborative project management apparatus 104 receives a selection, by the local user of the information handling device 102, to display an application screen of a second remote user of the multiple users.

In some embodiments, the project may include one or more of a document, a spreadsheet, a drawing, code, a simulation, a model, a presentation, a form, an animation, and an architecture. In certain embodiments, the project may include a CAD model.

The collaborative project management apparatus 104 displays 1004 on the information handling device 102 the application screen of the remote user. In certain embodiments, the application screen of the remote user is updated immediately as modifications to the project are made. In some embodiments, the display module 204 displays 1004 on the information handling device 102 the application screen of the remote user. In one embodiment, displaying 1004 on the information handling device 102 the application screen of the remote user includes displaying the application screen of the remote user within a managing application screen. In certain embodiments, the remote user receives no notification that their application screen is being displayed on the information handling device 102. In some embodiments, the remote user does not provide direct approval for their application screen to be displayed on the information handling device 102.

The collaborative project management apparatus 104 displays 1006 a local application screen that displays the project together with the application screen of the remote user. In some embodiments, the display module 204 displays 1006 the local application screen that displays the project together with the application screen of the remote user. The collaborative project management apparatus 104 enables 1008 the local user to modify the project within the local application screen. In some embodiments, the application module 302 enables 1008 the local user to modify the project within the local application screen.

The collaborative project management apparatus 104 immediately provides 1010 modifications to the project made by the local user to the multiple remote users. In such embodiments, application screens of each of the remote users may immediately update to show the modifications. The collaborative project management apparatus 104 displays 1012 a project tree 418 on the information handling device 102. In such embodiments, the project tree 418 may include a diagram illustrating multiple portions of the project and indicating which users are currently working on each portion of the multiple portions. In certain embodiments, the project tree 418 indicates a cumulative time spent by the users (individually and/or collectively) working on each portion of the project. In some embodiments, the tool module 304 displays 1012 the project tree 418 on the information handling device 102.

The collaborative project management apparatus 104 selectively displays 1014 a collaboration tool 420 that enables users to collaboratively provide graphical feedback regarding the project and to produce a collaborative output. In some embodiments, the tool module 304 displays 1014 the collaboration tool 420 that enables users to collaboratively provide graphical feedback regarding the project and to produce a collaborative output. The collaborative project management apparatus 104 attaches 1016 the collaborative output from the collaboration tool 420 to a corresponding portion of the project to provide documentation regarding the corresponding portion of the project. In some embodiments, the tool module 304 attaches 1016 the collaborative output from the collaboration tool 420 to the corresponding portion of the project to provide documentation regarding the corresponding portion of the project.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a display module that displays on an information handling device a project tree, wherein the project tree comprises a diagram illustrating a plurality of portions of a project used by a plurality of remote users in a collaborative environment and indicating which remote users are currently working on each portion of the plurality of portions;
a selection module that:
receives a selection by a local user of the information handling device of a selected portion of the plurality of portions of the project in the diagram illustrated in the project tree;
in response to receiving the selected portion, identifies one or more remote users currently working on the selected portion;
the display module further configured to, in response to identifying the one or more remote users, displays on the information handling device one or more application screens of the one or more identified remote users, wherein the application screens of the identified remote users are updated immediately as modifications to the project are made;
an application module that enables the local user to modify the project within a local application screen, wherein the display module displays each application screen of each identified remote user and the local application screen concurrently, and a displayed location of the application screen of each identified remote user is distinct from a displayed location of the local application screen, and
wherein at least a portion of the selection module and the display module comprise one or more of hardware and one or more non-transitory computer readable storage media, the one or more non-transitory computer readable storage media storing executable code.

2. The apparatus of claim 1, wherein the remote user does not provide direct approval for their application screen to be displayed on the information handling device.

3. A method comprising:
displaying on an information handling device a project tree, wherein the project tree comprises a diagram illustrating a plurality of portions of a project used by a plurality of remote users in a collaborative environment and indicating which remote users are currently working on each portion of the plurality of portions;
receiving a selection, by a local user of the information handling device, of a selected portion of the plurality of portions of the project in the diagram illustrated in the project tree;
in response to receiving the selected portion, identifying one or more remote users currently working on the selected portion;
in response to identifying the one or more remote users, displaying on the information handling device one or more application screens of the one or more identified remote users, wherein the application screens of the identified remote users are updated immediately as modifications to the project are made;
displaying a local application screen that displays the project together with the application screen of each identified remote user; and
enabling the local user to modify the project within the local application screen, wherein each application screen of each identified remote user and the local application screen are displayed concurrently, and a displayed location of each application screen of each identified remote user is distinct from a displayed location of the local application screen.

4. The method of claim 3, wherein the remote user of the plurality of remote users receives no notification that their application screen is being displayed on the information handling device.

5. The method of claim 3, wherein the remote user of the plurality of remote users does not provide direct approval for their application screen to be displayed on the information handling device.

6. The method of claim 3, comprising receiving a selection, by the local user of the information handling device, to display an application screen of a second remote user of the plurality of remote users.

7. The method of claim 3, comprising displaying the application screen of the remote user within a managing application screen.

8. The method of claim 3, comprising immediately providing modifications to the project made by the local user to the plurality of remote users, wherein an application screen of each of the remote users immediately updates to show the modifications.

9. The method of claim 3, wherein the project comprises one or more of a document, a spreadsheet, a drawing, code, a simulation, a model, a presentation, a form, an animation, and an architecture.

10. The method of claim 3, wherein the project comprises a computer-aided design ("CAD") model.

11. The method of claim 3, wherein the project tree indicates a cumulative time spent by the users working on each portion of the plurality of portions of the project.

12. The method of claim 3, comprising displaying a collaboration tool that enables users to collaboratively provide graphical feedback regarding the project and to produce a collaborative output.

13. The method of claim 12, comprising attaching the collaborative output from the collaboration tool to a corresponding portion of the project to provide documentation regarding the corresponding portion of the project.

14. A computer program product for collaborative project management, the computer program product comprising a computer readable storage medium having program instructions embodied therewith, the program instructions executable by a processor to cause the processor to:
  display on an information handling device a project tree, wherein the project tree comprises a diagram illustrating a plurality of portions of a project used by a plurality of remote users in a collaborative environment and indicating which remote users are currently working on each portion of the plurality of portions;
  receive a selection, by a local user of the information handling device, of a selected portion of the plurality of portions of the project in the diagram illustrated in the project tree;
  in response to receiving the selected portion, identify one or more remote users currently working on the selected portion;
  in response to identifying the one or more remote users, display on the information handling device one or more application screens of the one or more identified remote users, wherein the application screens of the identified remote users are updated immediately as modifications to the project are made;
  display a local application screen that displays the project together with the application screen of each identified remote user; and
  enable the local user to modify the project within the local application screen, wherein each application screen of each identified remote user and the local application screen are displayed concurrently, and a displayed location of each application screen of each identified remote user is distinct from a displayed location of the local application screen.

15. The computer program product of claim 14, wherein the program instructions executable by the processor further cause the processor to display the application screen of the remote user within a managing application screen.

* * * * *